(12) United States Patent
Datta et al.

(10) Patent No.: US 7,532,490 B2
(45) Date of Patent: May 12, 2009

(54) CONVERTER TOPOLOGY AND METHODS FOR INTERFACING AN ELECTRICAL MACHINE TO ELECTRICAL POWER GRID

(75) Inventors: Rajib Datta, Niskayuna, NY (US); Haiqing Weng, Shanghai (CN); Richard S. Zhang, Rexford, NY (US); Ravisekhar Raju, Clifton Park, NY (US); Allen M. Ritter, Roanoke, VA (US)

(73) Assignee: General Electric Company, Niskayuna, NY (US)

( * ) Notice: Subject to any disclaimer, the term of this patent is extended or adjusted under 35 U.S.C. 154(b) by 183 days.

(21) Appl. No.: 11/464,241

(22) Filed: Aug. 14, 2006

(65) Prior Publication Data

US 2008/0037190 A1    Feb. 14, 2008

(51) Int. Cl.
  *H02J 3/00* (2006.01)
  *H02M 5/40* (2006.01)
(52) U.S. Cl. .................. 363/34; 307/151; 363/71
(58) Field of Classification Search .................. 363/34, 363/71, 37, 124, 125; 307/151
  See application file for complete search history.

(56) References Cited

U.S. PATENT DOCUMENTS

| | | | | |
|---|---|---|---|---|
| 3,568,021 A | * | 3/1971 | Turnbull | 318/808 |
| 3,568,039 A | * | 3/1971 | Knight | 363/34 |
| 3,641,418 A | * | 2/1972 | Plette | 363/162 |
| 5,018,058 A | * | 5/1991 | Ionescu et al. | 363/34 |
| 5,483,140 A | * | 1/1996 | Hess et al. | 318/802 |
| 5,602,725 A | * | 2/1997 | Venkataramanan | 363/37 |
| 5,694,307 A | * | 12/1997 | Murugan | 363/37 |
| 5,847,943 A | * | 12/1998 | Vogel | 363/37 |
| 5,994,793 A | * | 11/1999 | Bobry | 307/64 |
| 6,009,002 A | * | 12/1999 | Steimer | 363/34 |
| 6,052,292 A | * | 4/2000 | Podlesak | 363/34 |
| 6,204,627 B1 | * | 3/2001 | Watanabe et al. | 318/729 |
| 6,519,169 B1 | * | 2/2003 | Asplund et al. | 363/132 |

(Continued)

OTHER PUBLICATIONS

Richard H. Osman. "A Comparison of Popular Medium-Voltage Motor Drives". Robicon Technical Document. 11 pages.

(Continued)

*Primary Examiner*—Akm E Ullah
*Assistant Examiner*—Arun Williams
(74) *Attorney, Agent, or Firm*—Ann M. Agosti

(57) ABSTRACT

A power converter for coupling an electrical machine to an electrical grid includes a machine side converter and a grid side converter, each, side having a plurality of corresponding stages for converting a three-phase electrical signal of the electrical machine to a three-phase electrical signal of the electrical grid. The machine side converter includes a plurality of single-phase bridges coupled in series. The grid side converter includes a plurality of three-phase bridges. Each three-phase bridge corresponds to one of the single-phase bridges of the machine side converter. Each three-phase bridge is coupled to the primary windings of a corresponding transformer. The secondary windings of each corresponding transformer is phase-shifted from its primary windings and is coupled to secondary windings of another respective transformer, thus providing for coupling of the three-phase bridges in a series.

17 Claims, 6 Drawing Sheets

U.S. PATENT DOCUMENTS

| | | | |
|---|---|---|---|
| 6,680,856 B2 * | 1/2004 | Schreiber | 363/71 |
| 6,867,987 B2 * | 3/2005 | Cheng et al. | 363/43 |
| 7,035,123 B2 * | 4/2006 | Schreiber et al. | 363/37 |
| 7,123,495 B2 * | 10/2006 | Endou et al. | 363/98 |
| 7,135,835 B2 * | 11/2006 | Yamada et al. | 318/800 |
| 2007/0195566 A1 * | 8/2007 | Nielsen et al. | 363/53 |

OTHER PUBLICATIONS

Tolbert, et al. "Multilevel Converters for Large Electric Drives" IEEE Transactions on Industry Applications, vol. 35, No. 1, Jan./Feb. 1999. pp. 36-44.

Shakweh, et al. "Assessment of Medium Voltage PWM VSI Topologies for Multi-Megawatt Variable Speed Drive Applications". Topics in AC Power Conversion. Session 24. pp. 965-971.

* cited by examiner

CONVERTER TOPOLOGY AND METHODS FOR INTERFACING AN ELECTRICAL MACHINE TO ELECTRICAL POWER GRID

BACKGROUND OF INVENTION

1. Field of the Invention

The present invention relates to connections to an electrical distribution grid, and in particular, to a converter topology for interfacing a load with the grid.

2. Background of the Related Art

Connection of large power generators and power loads to electric distribution grids calls for robust power converters capable of handling a variety of situations. For example, in high power applications such as where compressor drives and large wind turbines are connected to the grid, the power converter between the variable-speed machine and the grid should ensure high power quality both at a machine interface and at a grid interface. It is desirable that output from the power converter for connection of either one of the load and the supply provide three-phase power at medium voltage levels.

High power medium voltage power converters for industrial applications typically use different multilevel topologies. Popular examples of industrial power converters include power converters having a neutral point clamped (NPC) topology, a flying capacitor topology (FC) and an H-bridge series cell topology (HSC). The NPC and FC topologies present complexity in design and implementation beyond three-levels. Hence practical implementations of the NPC and the FC topologies for high power are usually limited to three level configurations—thus the output power quality is limited in some instances. The HSC topology can be scaled to high powers at high power quality; however, the HSC topology similarly calls for a transformer arrangement that is complex when scaled to high powers.

What is needed is a topology that can be scaled to higher powers and simultaneously can be designed for redundant mode of operation to increase availability. As the frequency for a coupled supply or load can vary over a wide range, the converter topology should be generic and provide for use in a variety of different applications.

BRIEF DESCRIPTION OF THE INVENTION

Disclosed is a power converter for coupling an electrical machine to an electrical grid, the power converter including: a machine side converter and a grid side converter, each side including a plurality of stages for together converting a three-phase electrical signal of the electrical machine to a three-phase electrical signal of the electrical grid; wherein the machine side converter includes a plurality of single-phase bridges coupled in a series and is configured for coupling with the electrical machine; wherein the grid side converter includes a plurality of three-phase bridges, each three-phase bridge corresponding to one of the single-phase bridges of the machine side converter; wherein each three-phase bridge is coupled to the primary windings of a transformer while the secondary windings of the transformer are phase-shifted from the primary windings thereof and are coupled to secondary windings of another transformer, thus providing for coupling of the plurality of three-phase bridges in a series, wherein a transformer at the end of the series is configured for coupling to the electrical grid; and wherein each single-phase bridge of the machine side converter is coupled to the corresponding three-phase bridge of the grid side converter by a direct current (DC) link.

Also disclosed is a method for converting an electric signal between an electrical machine and an electrical grid, the method including: selecting a power converter including a machine side converter and a grid side converter, each side including a plurality of corresponding stages for converting a three-phase electrical signal of the electrical machine to a three-phase electrical signal of the electrical grid; wherein the machine side converter includes a plurality of single-phase bridges coupled in a series and includes at least one coupling for coupling with the electrical machine; wherein the grid side converter includes a plurality of three-phase bridges, each three-phase bridge corresponding to one of the single-phase bridges of the machine side converter; wherein each three-phase bridge is coupled to the primary windings of a respective transformer while the secondary windings of the respective transformer are phase-shifted from the primary windings thereof and are coupled to secondary windings of another respective transformer, thus providing for coupling of the plurality of three-phase bridges in a series, wherein a transformer at the end of the series provides a coupling to at least the electrical grid; wherein each single-phase bridge of the machine side converter is coupled to the corresponding three-phase bridge of the grid side converter by a direct current (DC) link; wherein the power converter includes a coupling of the electrical machine to the machine side converter and a coupling the electrical grid to the grid side converter; applying the electrical signal to one of the electrical machine and the electrical grid; and controlling the power converter to convert the electrical signal.

Further disclosed is a method for fabricating a power converter for converting an electric signal between an electrical machine and an electrical grid, the method including: providing a machine side converter and a grid side converter, each side including a plurality of stages for converting a three-phase electrical signal of the electrical machine to a three-phase electrical signal of the electrical grid; for the machine side converter, coupling a plurality of single-phase bridges in a series and providing at least one coupling for coupling with the electrical machine; for the grid side converter, coupling a plurality of three-phase bridges in series, wherein each three-phase bridge corresponds to one of the single-phase bridges of the machine side converter; coupling each three-phase bridge to primary windings of a transformer and coupling secondary windings of the transformer that are phase-shifted from the primary windings to the secondary windings of another phase-shifted transformer, and further providing a coupling from one transformer at the end of the series for coupling with the electrical grid; coupling each single-phase bridge of the machine side converter to the corresponding three-phase bridge of the grid side converter with a direct current (DC) link.

BRIEF DESCRIPTION OF THE DRAWINGS

Referring now to the drawings wherein like elements are numbered alike in the several figures, wherein.

DETAILED DESCRIPTION OF THE INVENTION

The teachings herein provide for coupling of one of a load and a power supply to an electric grid by employing a power conversion system having an H-bridge series cell topology.

The converter topology for the power conversion system disclosed herein uses a plurality of single-phase bridges and a plurality of three-phase bridges to interface an electrical machine to a power grid. The plurality of single-phase bridges and the plurality of three-phase bridges are stacked up (provided in series) to form a H-bridge series cell topology. The output of the H-bridge cell topology is a three-phase electrical signal. The output voltage level (i.e., the converter voltage) for the three-phase electrical signal is determined by a direct current (DC) link voltage for each stage of the H-bridge cell topology as well as the number of stages. The three-phase converter voltage thus obtained is applied to the three phase terminals of an electrical machine. Typically, the DC links of the single-phase bridges are isolated. Each DC link is shared on a grid side by a three-phase bridge connected to a primary side of a respective three-phase phase-shifted transformer on the machine side. The secondary sides of the transformers are connected in series to form a resultant multilevel voltage electrical signal that is connected to the three-phase grid. The topology thus obtained can transfer power in a controlled manner between a variable frequency electrical machine and fixed frequency power grid. The torque of the machine can be suitably controlled in a dynamic manner as demanded by specific loads or prime movers and flux can be controlled over a range decided by the design of the electrical machine. The grid-side converter interface ensures high power quality at very high efficiency, in addition to excellent dynamic performance in controlling active and reactive powers. More detail is provided with reference to the figures.

Figure 1:
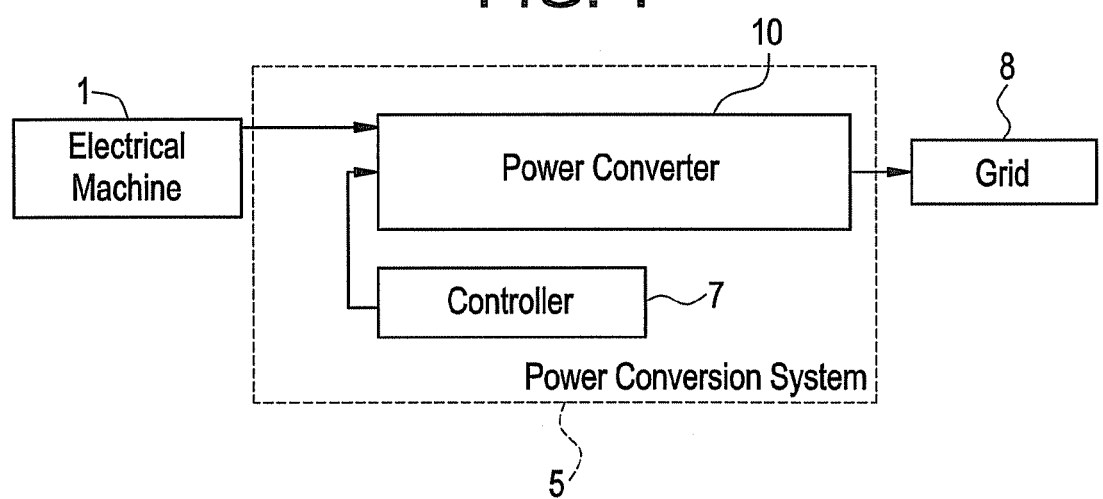
FIG. 1 depicts a power conversion system for coupling an electrical machine to an electrical grid.

Referring to FIG. 1, there are shown aspects of an exemplary power conversion system 5. The power conversion system 5 provides for coupling of an electrical machine 1 to a grid 8. The power conversion system 5 includes a power converter 10. In typical embodiments, the electrical machine 1 is a high power and high frequency machine that may be, for example, one of a generator and a motor (i.e., a load). In the illustrated example, the electrical machine 1 is a high speed and frequency motor. In typical embodiments, the grid 8 is an electrical distribution grid. Typically, a controller 7 is coupled to the power converter 10 and is configured to control aspects of operation of the power converter 10.

Figure 2:
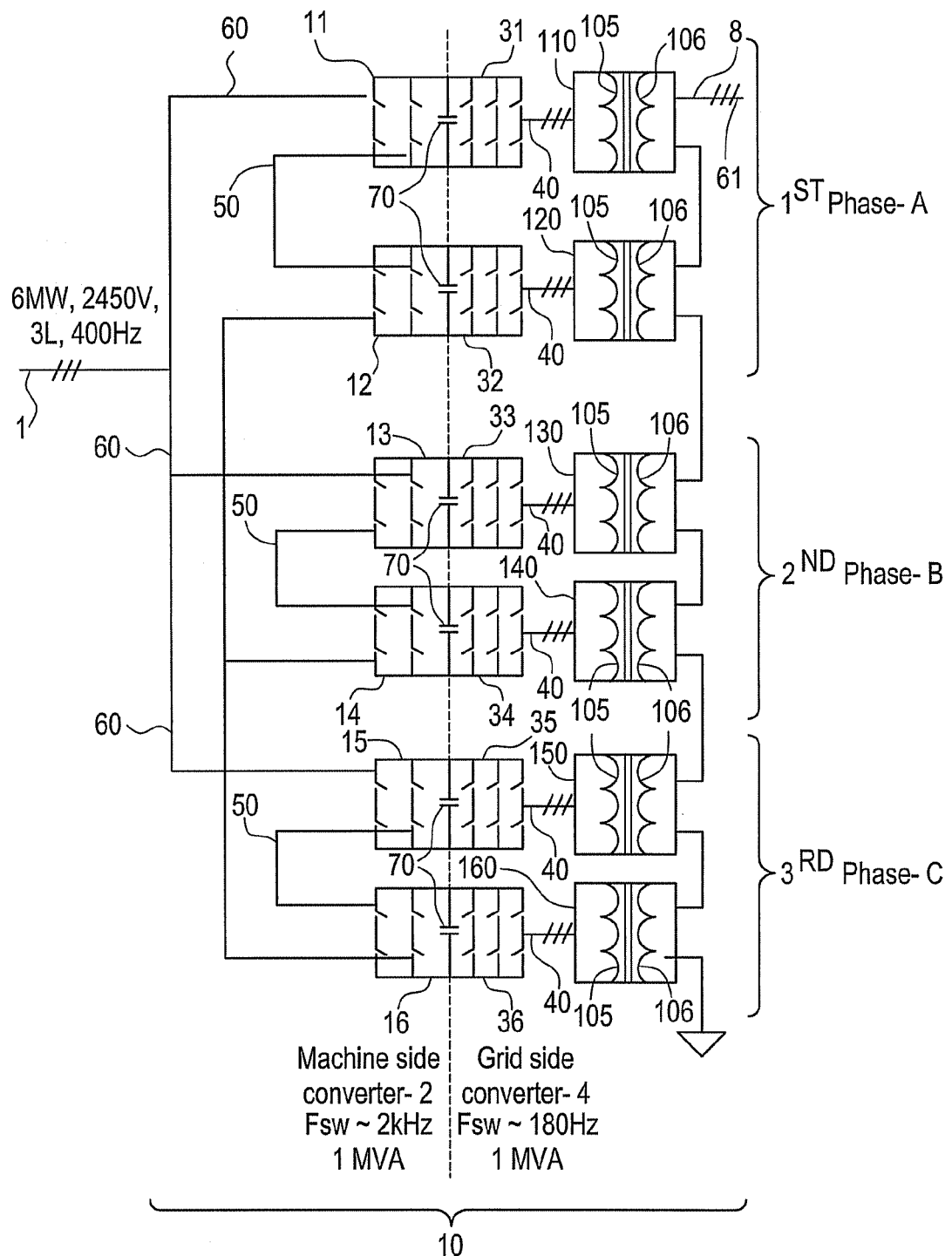
FIG. 2 depicts an exemplary topology for the power conversion system.

FIG. 2 provides a schematic representation of an exemplary circuit topology for the power converter 10. Although the example provided in FIG. 2 depicts a three-phase power conversion system, this is not limiting of the teachings herein. In FIG. 2, the power converter includes a machine side converter 2 and a grid side converter 4. In this example, a three-phase input signal is received by the machine side converter 2 from the electrical machine 1; while a three-phase output signal is provided by the grid side converter 4 to the electrical grid 8. As an overview, the power converter 10 includes an H-bridge topology for each phase (denoted as A, B, C) of the three-phases in the electrical signals.

When considering FIG. 2, first consider the topology with regard to a first-phase (A) of the three-phase electrical signal. Note the topology with regard to the second-phase (B) and the third-phase (C) is equivalent to the topology for the first-phase (A). It is considered that each phase provides for an "H-bridge" topology, as will become apparent with regard to the first phase.

For the first phase (A), and for the machine side converter 2, two single-phase bridges 11, 12 are coupled in series. The first single-phase bridge 11 is coupled to the second single-phase bridge 12. In this example, the coupled single-phase bridges 11, 12 receive an input signal 60 from the electrical machine 1, while an output of the two coupled single-phase bridges 11, 12 is coupled to an output for the remaining phases (B, C).

With regard to the grid side converter 4, a first three-phase bridge 31 is coupled in series with a second three-phase bridge 32 through a first transformer 110 and a second transformer 120. The first three-phase bridge 31 is coupled to the first transformer 110. A three-phase contactor 40 is coupled to the primary windings 105 of the first transformer 110. In turn, secondary windings 106 of the first transformer 110 are coupled to the secondary windings 106 of the second transformer 120. The primary windings 105 of the second transformer 120 are coupled to another three-phase contactor 40 which is coupled to the second three-phase bridge 32.

Each of the single-phase bridges 11-16 and the three-phase bridges 3136 include a direct current (DC) capacitor 70.

The foregoing arrangement for the first phase (A) is duplicated for the second phase (B) and the third phase (C). In this manner, an H-bridge topology is provided for the high speed machine 1. That is, the machine side converter 2 provides for the three phases (A, B, C) where two single-phase bridges 11-12; 13-14; and 15-16 connected in series service each phase. The six DC capacitors 70 are isolated. The grid side converter 4 includes six three-phase bridges 31-36, connected in series through six phase-shift transformers 110-160. The plurality of transformers 110-160 for the grid side converter 4 are phase-shifted between the primary windings 105 and the secondary windings 106 so as to enable harmonic cancellation through low-frequency switching of the three-phase bridges 31-36. Harmonic cancellation in the output voltage may be achieved for harmonics up through a $31^{st}$ order. The grid side converter 4 provides an output signal 61.

With this arrangement of six three-phase converters on the grid side whose secondary windings are connected in series, a thirty-six pulse converter system is configured. By adjusting the phase of the fundamental voltage applied by the three phase bride to the transformer primary, equal and opposite to the phase shift between the transformer primary windings and secondary windings, all low order harmonics (up to the $31^{st}$ order) are eliminated.

The topology shown in FIG. 2 is merely an exemplary circuit configuration. That is, several variations can be configured depending on the power and voltage requirements. The H-bridges on the machine side are stacked in series to provide a three-phase multilevel voltage output, the number of levels being dependant on the number of stages of single-phase bridges. The switching of the H-bridges is pulse width modulated (PWM), typically using sine-triangle method (where the triangle carriers are suitably phase-shifted to increase the effective switching frequency at the machine terminals). However, other methods of implementation such as harmonic elimination, space vector etc. can be used to generate the multilevel output on the machine side. One the grid side, the three phase converter units connected to the phase-shifted transformer primary windings 105 are switched with gating signals that are phase-shifted appropriately in a time-phase. The phase-shift in the transformers 110-160 in conjunction with the phase shift in the gating signals result in cancellation of low order harmonics. The order of harmonics cancelled depends on the number of three-phase bridge-transformer pairs. The multilevel output voltage of the grid side converter 4 is obtained by connecting the secondary windings 106 in series in an appropriate manner. Inserting notches in the switching signal at or near the zero-crossings controls the magnitude of the output voltage however, modulation of the voltage can be achieved using other switching strategies. The present implementation results in minimum switching of the grid side converter 4 and hence results in very high efficiency.

In this example, the power converter 10 is rated for six megawatts (MW), with each bridge (for the machine side converter 2 and the grid side converter 4) being rated for 1 MW.

As stated above, the topology provided for the first phase (A) is repeated for each of the second phase (B) and the third phase (C). However, for the grid side converter 4, the secondary windings 106 in the plurality of transformers 110-160 are open at both ends (of the series).

In operation, the machine side converter 2 controls stator current and air-gap torque, while the grid side converter 4 maintains a constant DC voltage. In the typical embodiment, the machine side converter 4 operates at about 2 kHz pulse width modulation (PWM), with the PWM in the two bridges for each phase is interleaved. In this embodiment, the grid side converter 4 operates in a multi-pulse mode and the switching frequency is approximately three times a grid frequency (i.e., the switching frequency is about 3*60 Hz or 180 Hz).

In this example (and for convention), it is considered that the grid side converter 4 is a thirty six (36) pulse system. That is, the grid side converter 4 includes six transformers and six three-phase bridges thus forming thirty six (36) pulses.

Figure 3:
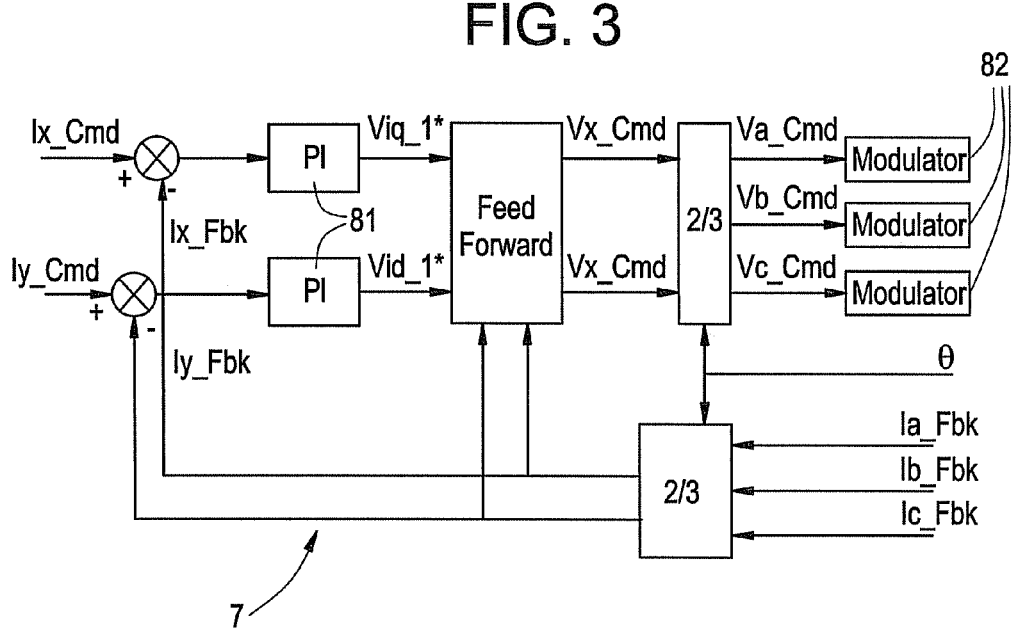
FIG. 3 is a control diagram providing control logic for a machine side converter of the power conversion system.
Figure 4:
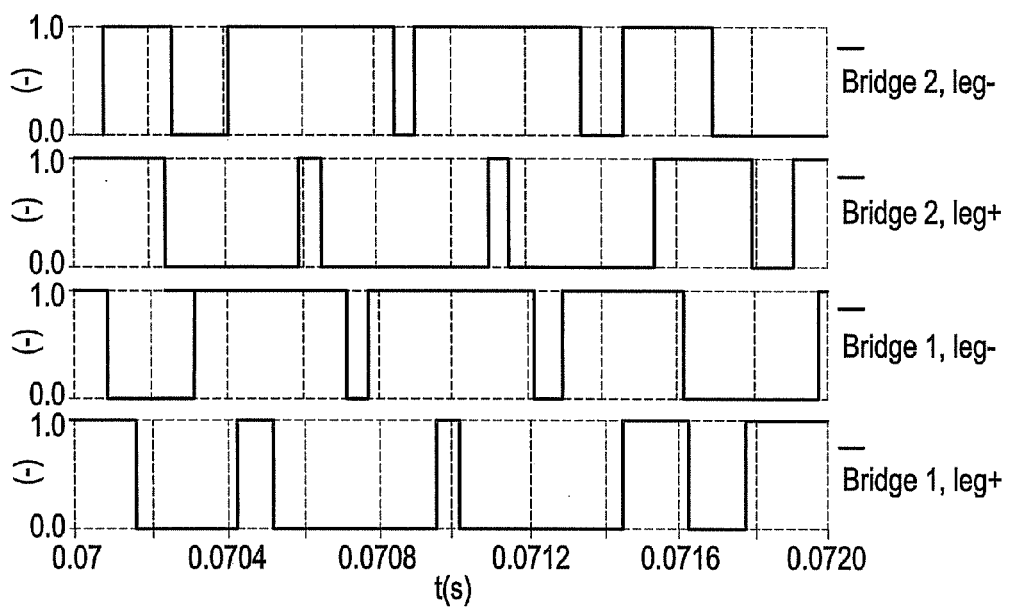
FIG. 4 provides signaling diagrams for a single-phase H-bridge of the machine side converter.

In FIG. 3, an exemplary control diagram is provided for the machine side converter 2. In this embodiment, stator current ($I_x$Cmd, $I_y$Cmd) for the electrical machine 1 is controlled by two PI regulators 81 on the rotating reference frame that is synchronized to a rotor of the electrical machine 1. The voltage command is transferred to a three-phase value ($V_a$Cmd, $V_b$Cmd, $V_c$Cmd) and an independent modulator 82 is used for each phase. In this example, the PWM for the two bridges of each phase (A, B, C) is interleaved to reduce the stator voltage harmonics. FIG. 4 depicts the simulated PWM waveforms resulting from simulation of the electrical machine at 350 Hz.

In FIG. 3, $I_x$_Cmd represents a current command to control active power. $I_y$_Cmd represents another current command to control reactive power. Each of the machine feedback currents are oriented in the x-y (synchronous) reference frame and controlled through the PI-regulator 81 with corresponding feed-forward compensation to track the set references. Therefore, the control system gives the ability to control the motor torque (i.e., active power) and excitation (i.e., reactive power). A controller for the grid side converter 4 works in a similar manner, providing the ability to regulate the flow of active power to or from the grid 8 and the ability to control grid power factors according to requirements for operation of the grid.

Figure 5:
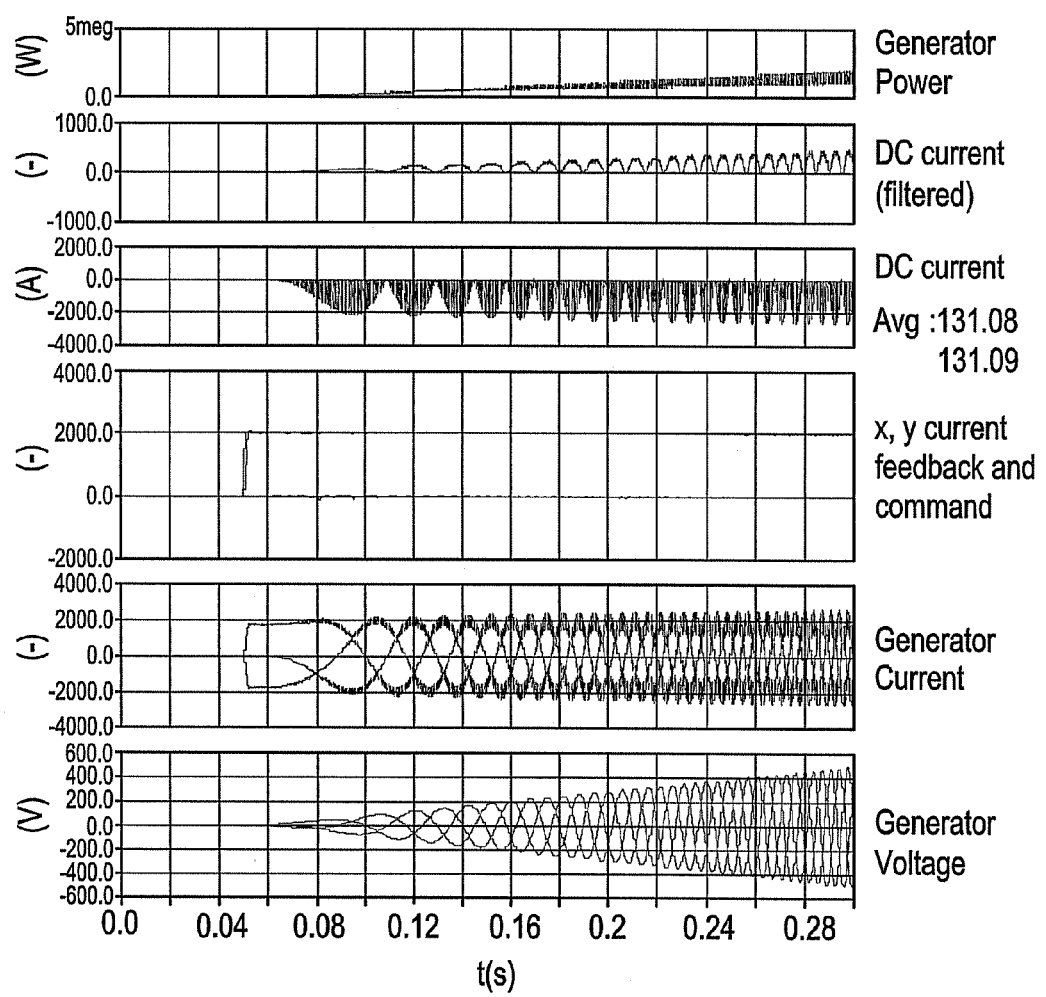
FIG. 5 depicts aspects of operation of the machine side converter during start-up.
Figure 6:
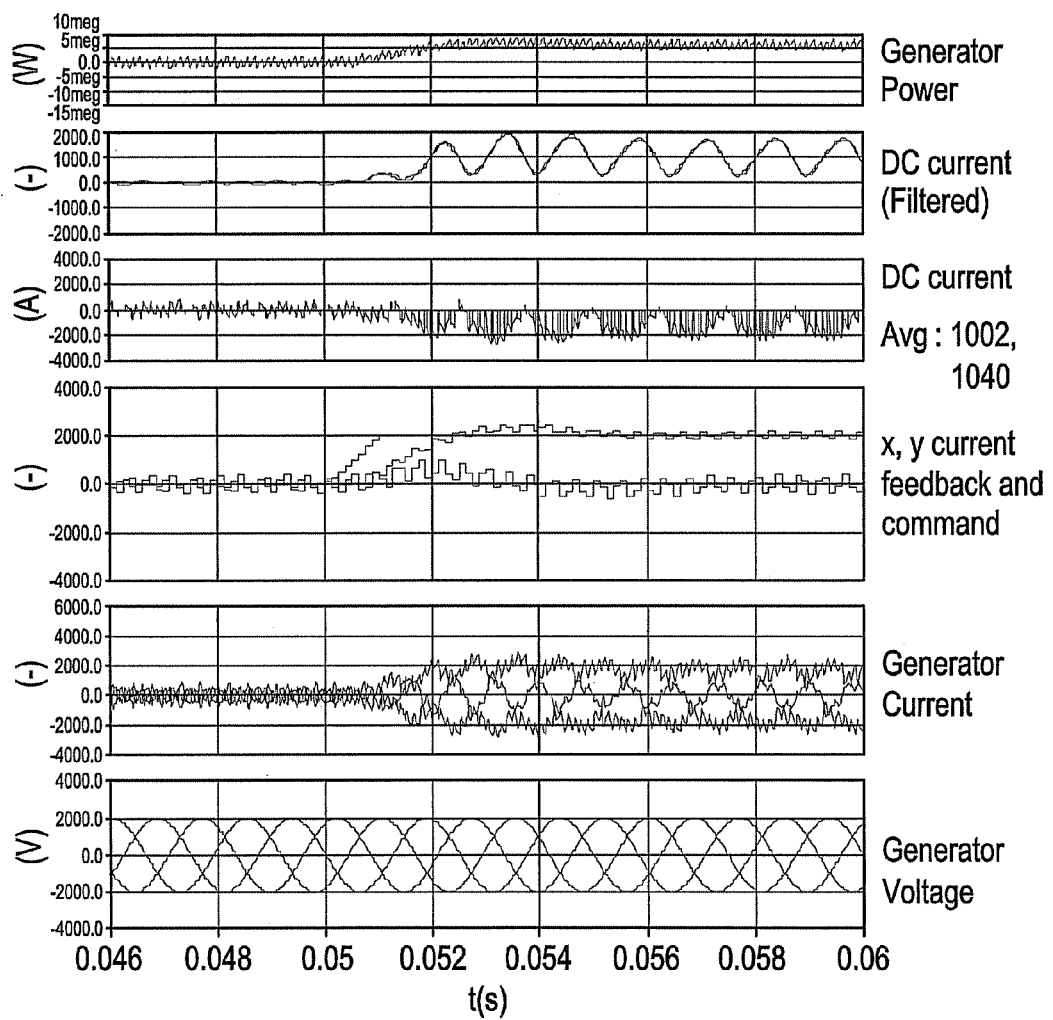
FIG. 6 depicts aspects of operation of the machine side converter during operation.

As a test of the design, performance of the machine side converter 2 was simulated without the grid side converter 4 and assuming constant DC voltage. FIG. 5 depicts simulation results for the machine side converter 2 during start up of the electrical machine 1. The machine stator current ($I_x$Cmd, $I_y$Cmd) is well controlled while the filtered DC current shows some ripple that is double the stator frequency. FIG. 6 shows the simulation results resulting when the electrical machine 1 is operating at 400 Hz.

It can be seen from the simulation results that the machine stator current ($I_x$Cmd, $I_y$Cmd) is well controlled when the DC voltage is constant. It should be noted that during high-frequency operation, there may be slight power differences between the two bridges, the effect of which may be evaluated with further investigation.

Figure 7:
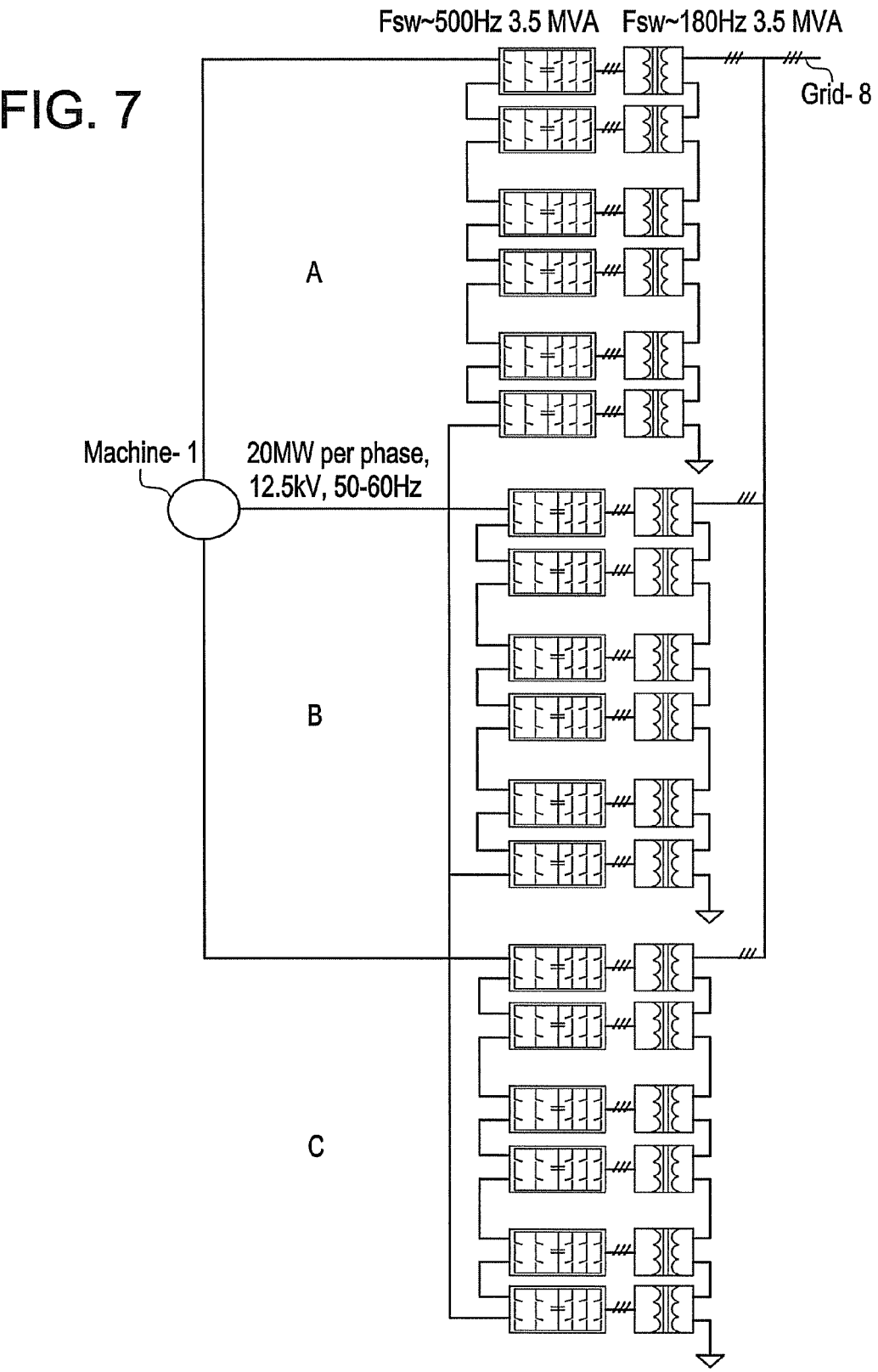
FIG. 7 depicts another example of a converter topology.

Referring to FIG. 7, another embodiment of the circuit topology is shown. Note that the depiction in FIG. 7 is incomplete. That is, the stages associated with the third-phase (C) have been omitted as being repetitious. In this example, each phase (A, B, C) of the machine is fed through six (6) series-connected single-phase bridges. Each phase of the machine side converter 2 is connected to a 36-pulse converter system on the grid side converter 4 through isolated DC links. In this embodiment, the phases (A, B, C) for the machine side are more evenly distributed, and thus a more balanced design is provided. In this example, the electrical machine 1 provides an output signal of 20 MW per phase at 12.5 kV with a frequency of about 50 to 60 Hz. In this example, the fundamental switching frequency for the machine side converter 2 is about 500 Hz, while the fundamental switching frequency for the grid side converter 4 is about 180 Hz. Each of the single-phase bridges and the three-phase bridges are rated for about 3.5 MVA.

The teachings herein provide for using single-phase and three-phase bridges to obtain a modular converter topology for interfacing an electrical machine to the utility. This provides for a high degree of quality in generated power both at the machine and grid interface. Further, excellent dynamic performance is achieved for the machine interface and the grid interface (where the dynamic performance is considered in terms of control of active power and reactive power). In addition, the modular topology is capable of operating over a wide frequency range on the machine side and scalable to very high power ratings.

More specifically, excellent power quality is achieved even for a very high power converter design, thus eliminating a need for additional filtering both on the machine side and the grid side. Low current ripple results in low torque pulsations resulting in reduced mechanical stresses. Modular design enables built-in redundancy so that continued operation is possible during a converter fault, simply by bypassing the faulted converter module. This translates to high system availability. A further advantage is that modular design provides for cost reduction through volume production.

One skilled in the art will recognize that variations of the teachings herein may be had. For example, various adjustments to the architecture of the machine side converter and the grid side converter may be realized. These variations may provide for conversion of electrical signals that are other than three-phase. That is, conversion may be provided for multi-phase signals and poly-phase signals in addition to the exemplary embodiment of three-phase signals provided herein.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A power converter for coupling an electrical machine to an electrical grid, the power converter comprising:
   a machine side converter and a grid side converter, each side comprising a plurality of stages for together converting a three-phase electrical signal of the electrical machine to a three-phase electrical signal of the electrical grid;
   wherein the machine side converter comprises a plurality of single-phase bridges coupled in a series and is configured for coupling with the electrical machine;
   wherein the grid side converter comprises a plurality of three-phase bridges, each three-phase bridge corresponding to one of the single-phase bridges of the machine side converter;
   wherein each three-phase bridge is coupled to the primary windings of a transformer while the secondary windings of the transformer are phase-shifted from the primary windings thereof and are coupled to secondary windings of another transformer, thus providing for coupling of the plurality of three-phase bridges in a series, wherein a transformer at the end of the series is configured for coupling to the electrical grid; and
   wherein each single-phase bridge of the machine side converter is coupled to the corresponding three-phase bridge of the grid side converter by a direct current (DC) link.

2. The power converter as in claim 1, wherein each stage of the machine side converter comprises two single-phase bridges and each stage of the grid side converter comprises two three-phase bridges.

3. The power converter as in claim 1, wherein each stage of the machine side converter comprises six single-phase bridges and of the grid side converter six three-phase bridges.

4. The power converter as in claim 1, wherein the electrical machine comprises one of an electrical generator and an electrical load.

5. The power converter as in claim 1, wherein an output voltage level is determined by the DC link voltage of each stage and the number of stages.

6. The power converter as in claim 1, wherein the DC link for each of the single-phase bridges is isolated.

7. The power converter as in claim 1, wherein the electrical signal of the electrical machine comprises a three-phase electrical signal comprising a variable frequency.

8. The power converter as in claim 1, wherein the electrical signal of the electrical machine comprises a multi-phase electrical signal.

9. A method for converting an electric signal between an electrical machine and an electrical grid, the method comprising:
   selecting a power converter comprising a machine side converter and a grid side converter, each side comprising a plurality of corresponding stages for converting a three-phase electrical signal of the electrical machine to a three-phase electrical signal of the electrical grid; wherein the machine side converter comprises a plurality of single-phase bridges coupled in a series and comprises at least one coupling for coupling with the electrical machine; wherein the grid side converter comprises a plurality of three-phase bridges, each three-phase bridge corresponding to one of the single-phase bridges of the machine side converter; wherein each three-phase bridge is coupled to the primary windings of a respective transformer while the secondary windings of the respective transformer are phase-shifted from the primary windings thereof and are coupled to secondary windings of another respective transformer, thus providing for coupling of the plurality of three-phase bridges in a series, wherein a transformer at the end of the series provides a coupling to at least the electrical grid; wherein each single-phase bridge of the machine side converter is coupled to the corresponding three-phase bridge of the grid side converter by a direct current (DC) link;
   wherein the power converter comprises a coupling of the electrical machine to the machine side converter and a coupling the electrical grid to the grid side converter;
   applying the electrical signal to one of the electrical machine and the electrical grid; and
   controlling the power converter to convert the electrical signal.

10. The method as in claim 9, wherein controlling comprises dynamically controlling active power flow between the machine side converter and the grid side converter through the DC links such that power flow in the DC links is balanced.

11. The method as in claim 9, wherein controlling comprises controlling reactive loading of the electrical machine over a range determined by a design of the electrical machine design.

12. The method as in claim 9, wherein controlling comprises controlling reactive power at an interface with the electrical grid over a range determined by grid requirements.

13. The method as in claim 9, wherein controlling comprises maintaining a low switching frequency for the plurality of three-phase bridges with harmonic cancellation through phase shifted transformers in comparison to a pulse width modulation switching frequency for the single-phase bridges.

14. The method as in claim 9, wherein controlling comprises controlling at least one of the active power and the reactive power in the power converter.

15. The method as in claim 9, wherein a switching frequency of the grid side converter comprises of frequency of about three times the grid frequency.

16. The method as in claim 9, wherein controlling comprises providing cancellation of harmonics in the electrical signal.

17. A method for fabricating a power converter for converting an electric signal between an electrical machine and an electrical grid, the method comprising:
   providing a machine side converter and a grid side converter, each side comprising a plurality of stages for converting a three-phase electrical signal of the electrical machine to a three-phase electrical signal of the electrical grid;
   for the machine side converter, coupling a plurality of single-phase bridges in a series and providing at least one coupling for coupling with the electrical machine;
   for the grid side converter, coupling a plurality of three-phase bridges in series, wherein each three-phase bridge corresponds to one of the single-phase bridges of the machine side converter;
   coupling each three-phase bridge to primary windings of a transformer and coupling secondary windings of the transformer that are phase-shifted from the primary windings to the secondary windings of another phase-shifted transformer, and further providing a coupling from one transformer at the end of the series for coupling with the electrical grid;
   coupling each single-phase bridge of the machine side converter to the corresponding three-phase bridge of the grid side converter with a direct current (DC) link.

* * * * *